United States Patent Office 3,031,472
Patented Apr. 24, 1962

3,031,472
NEW 15-SUBSTITUTED ESTRONES AND ESTRA-
DIOLS AND METHODS OF PREPARING THE
SAME
Seymour Bernstein, New City, and Edward W. Cantrall,
Pearl River, N.Y., and Ruddy Littell, River Vale, N.J.,
assignors to American Cyanamid Company, New York,
N.Y., a corporation of Maine
No Drawing. Filed Oct. 24, 1961, Ser. No. 147,205
12 Claims. (Cl. 260—397.4)

This invention relates to new steroid compounds of the C–18 series. More particularly, it relates to C–15 substituted estrones and estradiols and methods of preparing the same.

The novel steroids of the present invention can be illustrated by the following structural formula:

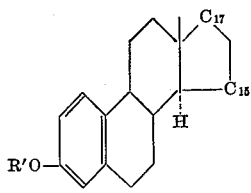

wherein $R^1$ is a member of the group consisting of hydrogen and lower alkyl radicals, $C_{17}$ is a divalent radical of the group consisting of

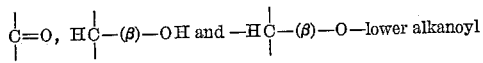

$C_{15}$ is a divalent radical of the group consisting of

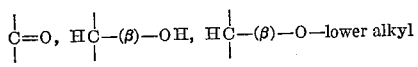

and

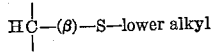

and when $C_{15}$ is

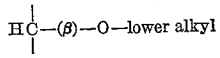

then $R^1$ is hydrogen.

The present compounds are, in general, white crystalline solids relatively insoluble in water but soluble in methanol, ethanol, ethyl acetate, acetone and the like.

Many of the 15-substituted estrones, i.e. those above having a keto group at C–17, can be prepared by reacting a 3-hydroxy or lower alkoxy-1,3,5(10),15-estratetraen-17-one with a nucleophilic agent, such as, lower alkyl alkoxides or lower alkyl thioalkoxides. These nucleophilic agents can be, for example, sodium methoxide, potassium methoxide, sodium ethoxide, potassium ethoxide, and the alkali metal derivatives of methyl mercaptan, ethylmercaptan, propyl mercaptan and the like.

The reaction is preferably carried out at a temperature within the range of from 15° C. to about 60° C. for a period of from 15 minutes to 4 hours. It is usually desirable to have present a solvent such as, for example, tetrahydrofuran.

Further C–15 substituted estrones of the invention may then be prepared from the 15-benzyloxy estrones described and claimed in our co-pending application Serial No. 147,149, filed of even date. As illustration, for example, is the preparation of 15β-hydroxy-3-methoxy-1,3,5(10)-estratrien-17-one from 15-benzyloxy-3-methoxy-1,3,5(10)-estratrien-17-one by catalytic hydrogenation.

The C–15 substituted estradiols of this invention can be illustrated by the following formula:

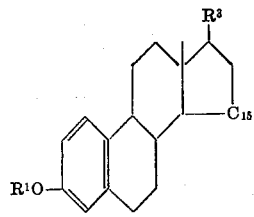

wherein $R^1$ and $C_{15}$ are as defined above, and $R^3$ is a member of the group consisting of (β)-hydroxyl and (β)-lower alkanoyloxy radicals, may be prepared by reducing an appropriate C–15 substituted estrone of the invention with, for example, sodium borohydride, potassium borohydride, lithium aluminum hydride or the like, as follows:

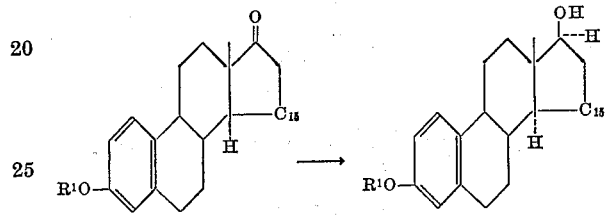

wherein $R^1$ and $C_{15}$ are as defined above.

Also the C–15 hydroxy substituted estradiols can be prepared from the corresponding 15-benzyloxy estradiols such as described in application Serial No. 147,149, filed of even date by catalytic hydrogenation. For example, 17β-acetoxy-3-methoxy-1,3,5(10)-estradien-15β-ol can be prepared from 17β-acetoxy-15β-benzyloxy-3-methoxy-1,3, 5(10)-estratriene by catalytic hydrogenation.

The steroids of the present invention are pharmacologically active. They are useful in the treatment of hypercholesterolemia and disorders associated therewith. Their biological activity is selective and they can achieve other responses of the estrogenic hormones without producing a corresponding feminization. The compounds are therefore useful in the treatment of cardiovascular and circulatory disorders often associated with or indicated by higher content of cholesterol in the animal system.

The following examples describe in detail the preparation of representative C–15 substituted estrones and estradiols of the present invention.

EXAMPLE 1

*Preparation of 3-Hydroxy-15β-Methoxy-1,3,5(10)-Estratrien-17-one*

A solution of 1.2 g. of 16-bromoestrone acetate and 220 mg. of p-toluenesulfonic acid monohydrate in 60 ml. of toluene and 5 ml. of ethyleneglycol is distilled slowly through a Vigreux column for 44 hours. (Total distillate 45 ml.) The reaction mixture is cooled, neutralized with saturated sodium bicarbonate solution diluted with ethyl acetate, washed with saturated saline, dried and evaporated. Crystallization of the crude residue from methanol gives 825 mg. of white crystals, melting point 234–236° C. Two further crystallizations from the same solvent gives the pure bromoketal, melting point 246–247° C.

A solution of 400 mg. of potassium in 20 ml. of t-butyl alcohol is evaporated to dryness when 20 ml. of xylene is added and the evaporation is repeated. A solution of 600 mg. of the bromoketal in 40 ml. of xylene is added to the potassium t-butoxide and the mixture is heated under reflux in an atmosphere of nitrogen for 18 hours. Upon cooling, the mixture is diluted with ether, washed with saturated saline, dried and evaporated to give 275 mg. of a pasty solid which is crystallized from methanol to give 130 mg. of white crystals, melting point 215–219° C. Two additional crystallizations from acetone-petroleum ether gives the pre ketal tetraene, melting point 218–220° C.

A solution of 1.0 g. of 17-ethylenedioxy-1,3,5(10),15-estratetraen-3-ol and 60 mg. of p-toluenesulfonic acid monohydrate in 70 ml. of acetone and 12 ml. of water is stirred at room temperature for 1.5 hours. The solution is then diluted with 350 ml. of ether, washed once with dilute sulfuric acid, once with dilute sodium bicarbonate solution and finally with saturated saline. After evaporation of the solvents, the resulting solid is crystallized from methanol to give 475 mg. of 15-dehydroestrone, melting point 249–251° C. Further crystallization of the product from methanol and from chloroform-methanol gives the pure sample, melting point 250–252° C.

A solution of 450 mg. of 15-dehydroestrone in 5 ml. of tetrahydrofuran and 50 ml. of methanol is stirred with 1.2 ml. of aqueous 5% sodium hydroxide for 0.5 hour. Water is added and 450 mg. of $15\beta$-methoxyestrone, melting point 223–227° C. is collected by filtration. Two crystallizations from acetone-petroleum ether gives a constant melting product, melting point 224–226° C.

EXAMPLE 2

*Preparation of $15\beta$-Methoxy-1,3,5(10)-Estratrien-3,17$\beta$-Diol*

A solution of 200 mg. of $15\beta$-methoxyestrone and 200 mg. of sodium borohydride in 20 ml. of methanol is stirred at room temperature for one hour. Water is added and the resulting oil is diluted with chloroform, washed once with saturated saline, dried and evaporated to give an oil. Crystallization from acetone-petroleum ether gives 160 mg. of crystals, melting point 85–95° C. containing acetone of crystallization. Two further crystallizations from ether-benzene gives $15\beta$-methoxyestradiol, melting point 128–130° C.

EXAMPLE 3

*Preparation of $15\beta$-Hydroxy-3-Methoxy-1,3,5(10)-Estratrien-17-one*

A solution of 2.0 g. of 3-methoxy-1,3,5(10),15-estratetraen-17-one in 60 ml. of benzyl alcohol is stirred in an atmosphere of nitrogen with 1.5 g. of powdered potassium hydroxide for 3.5 hours. Addition of ethyl acetate causes the formation of a precipitate which is removed by filtration. The filtrate is steam distilled and the aqueous residue from the distillation is extracted with ethyl acetate, washed twice with saturated saline, dried and evaporated. The resulting oil is chromatographed on 100 g. of a magnesium silicate adsorbent. The fractions eluted with ether-benzene (1:10) gives 2.19 g. of an oil which yields 490 mg. of crystals, melting point 87–89° C., upon crystallization from ether-petroleum ether. The mother liquor, after evaporation, is subjected to partition chromatography on diatomaceous earth with n-heptane-methyl Cellosolve. This gives 1.3 g. of oil, which upon crystallization from methanol gives an additional 660 mg. of 15-benzyloxy compound, melting point 90–92° C. An analytically pure sample obtainable by crystallization from ether-petroleum ether has the melting point 96–98° C.

A solution of 162 mg. of $15\beta$-benzyloxy-3-methoxy-1,3,5(10)-estratrien-17-one in 4 ml. of acetic acid containing 100 mg. of 10% palladium-on-carbon is hydrogenated at 28° C. and 729 mm. pressure for four hours. The catalyst is filtered and the residue is washed with small portions of methanol. The combined filtrates are evaporated and crystallized from acetone-ether to give 63 mg. of $15\beta$-hydroxyestrone methyl ether, melting point 186–188° C. A single crystallization from acetone-petroleum ether gives melting point 186–188° C.

EXAMPLE 4

*Preparation of $17\beta$-Acetoxy-3-Methoxy-1,3,5(10)-Estratrien-$15\beta$-ol*

A solution of 660 mg. of $15\beta$-benzyloxy estrone methyl ether and 600 mg. of sodium borohydride in 60 ml. of methanol containing 5 drops of 10% aqueous sodium hydroxide is stirred at room temperature for three hours. Addition of water caused the formation of a gelatinous precipitate which is filtered, dissolved in ethyl acetate, washed with saturated saline, dried and evaporated to an intractable oil whose infrared spectrum showed the absence of a carbonyl function. The oil, $15\beta$-benzyloxy-3-methoxy-1,3,5(10)-estratrien-17$\beta$-ol, is heated for one hour at 95° C. with 4 ml. of pyridine and 1 ml. of acetic anhydride. Upon cooling, the reaction mixture is diluted with ethyl acetate, washed with saturated saline, dried and evaporated. The resulting crude residue is crystallized from methanol to give 474 mg. of the 15-benzyloxy-17-acetate, melting point 118–120° C. The analytically pure specimen, obtained by further crystallization from methanol has a melting point of 118–120° C.

A solution of 700 mg. of $17\beta$-acetoxy-$15\beta$-benzyloxy-3-methoxy-1,3,5(10)-estratriene in 20 ml. of acetic acid containing 220 mg. of 10% palladium-on-carbon is hydrogenated at 27° C. and 755 mm. pressure for 4.5 hours. The catalyst is filtered and washed with several small portions of methanol. The combined filtrates are evaporated and the residue is crystallized from acetone-petroleum ether to give 425 mg. of the $17\beta$-acetoxy-$15\beta$-hydroxy compound, melting point 126–128° C. The analytically pure sample obtained by several crystallizations from acetone-petroleum ether has a melting point of 134–135° C.

EXAMPLE 5

*Preparation of $17\beta$-Acetoxy-3-Methoxy-1,3,5(10)-Estratrien-15-one*

To a previously prepared complex of 345 mg. of chromium trioxide in 5 ml. of pyridine at 0° C. is added 380 mg. of $17\beta$-acetoxy-3-methoxy-1,3,5(10)-estratrien-$15\beta$-ol in 10 ml. of pyridine and the mixture is stirred at room temperature for 20 hours. The reaction mixture is diluted with chloroform, filtered, and the residue is washed several times with chloroform. The combined filtrates are washed with saturated saline, dried and evaporated to a residue containing a small amount of pyridine. Addition of water to this residue gives 200 mg. of white powder, melting point 150–157° C. Four crystallizations from acetone-petroleum ether gives the constant melting product in a slightly solvated form, melting point 156–158° C.

EXAMPLE 6

*Preparation of 3-Methoxy-1,3,5(10)-Estratriene-$15\beta,17\beta$-Diol*

A. To a solution of 195 mg. of $15\beta$-hydroxyestrone methyl ether in 50 ml. of tetrahydrofuran is added a clear solution of 300 mg. of lithium aluminum hydride in 20 ml. of tetrahydrofuran and the mixture is stirred at room temperature for three hours. After cautious decomposition of excess reagent with water, the mixture is filtered and the filtrate is evaporated and crystallized from methanol to give 156 mg. of the diol, melting point 184–186° C. Recrystallization from methanol does not alter the melting point.

B. A clear solution of 100 mg. of $17\beta$-acetoxy-3-methoxy-1,3,5(10)-estratrien-15-one and 150 mg. of lithium aluminum hydride in 50 ml. of tetrahydrofuran is allowed to stand at room temperature for 18 hours. After cautious addition of water the reaction mixture is filtered and the filtrate is evaporated. Crystallization of the crude residue from methanol gives 80 mg. of the diol, melting point 182–184° C. The product is crystallized again from methanol to give a melting point of 183–185° C.

EXAMPLE 7

*Preparation of 3,15β-Dihydroxy-1,3,5(10)-Estratrien-17-one*

A solution of 300 mg. of 15β-benzyloxyestrone in 4 ml. of acetic acid containing 100 mg. of 10% palladium-on-carbon is hydrogenated at 28° C. and 765 mm. pressure for four hours. The catalyst is filtered and the filtrate is diluted with ethyl acetate, washed once with 5% sodium hydroxide solution and twice with saturated saline dried and evaporated. Three crystallizations of the crude residue from acetone-petroleum ether gives pure 15β-hydroxy-estrone, melting point 224–227° C.

EXAMPLE 8

*Preparation of 15β-Ethylthio-3-Methoxy-1,3,5(10)-Estratrien-17-one*

A solution of 300 mg. of 15-dehydroestrone methyl ether in 10 ml. of tetrahydrofuran, 2 ml. of ethyl mercaptan and 20 drops of 5% sodium hydroxide solution is stirred at room temperature for two hours. The solution is diluted with benzene, washed to neutral with water, dried and evaporated to an oil which is subjected to partition chromatography on diatomaceous earth using a n-heptane-methyl Cellosolve solvent system. This gives the desired product of the example.

We claim:

1. A compound of the formula:

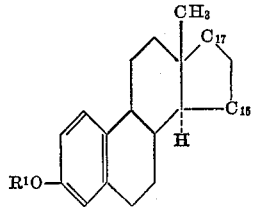

wherein $R^1$ is a member of the group consisting of hydrogen and lower alkyl radicals, $C_{17}$ is a divalent radical of the group consisting of

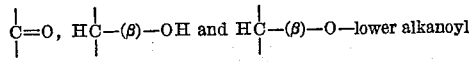

$C_{15}$ is a divalent radical of the group consisting of

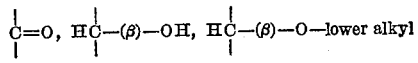

and

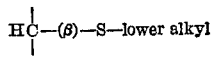

and when $C_{15}$ is

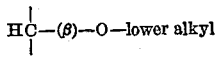

then $R^1$ is hydrogen, and when $C_{15}$ is

then $C_{17}$ is a member of the group consisting of

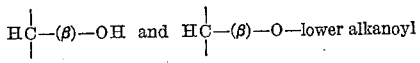

2. The compound 3-hydroxy-15β-methoxy-1,3,5(10)-estratrien-17-one.
3. The compound 15β-methoxy-1,3,5(10)-estratrien-3,17β-diol.
4. The compound 15β-hydroxy-3-methoxy-1,3,5(10)-estratrien-17-one.
5. The compound 17β-acetoxy-3-methoxy-1,3,5(10)-estratrien-15β-ol.
6. The compound 17β-acetoxy-3-methoxy-1,3,5(10)-estratrien-15-one.
7. The compound 3-methoxy-1,3,5(10)-estratriene-15β,17β-diol.
8. The compound 3,15β-dihydroxy-1,3,5(10)-estratrien-17-one.
9. The compound 15β-ethylthio-3-methoxy-1,3,5(10)-estratrien-17-one.
10. A method of preparing a compound of the formula:

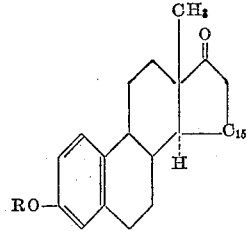

wherein R is selected from the group consisting of hydrogen and lower alkyl radicals and $C_{15}$ is selected from the group consisting of

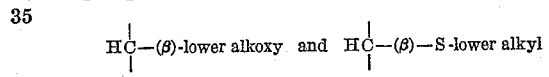

which comprises reacting a steroid of the formula:

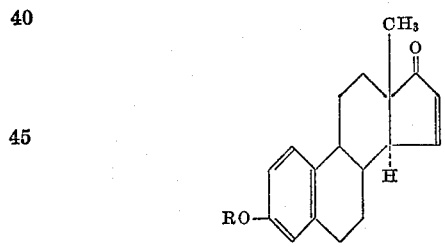

wherein R is as defined above, with a member selected from the group consisting of lower alkyl alkoxides and lower alkyl thioalkoxides and recovering said products therefrom.

11. A method of preparing 15β-methoxy-estrone which comprises treating 15-dehydroestrone with methanol in the presence of an alkali metal hydroxide and recovering said compound therefrom.

12. A method of perparing 15β-ethylthio-3-methoxy-1,3,5(10)-estratrien-17-one which comprises contacting 15-dehydroestrone methyl ether with ethyl mercaptan in the presence of an alkali metal hydroxide and recovering said compound therefrom.

No references cited.